(12) United States Patent
Hils

(10) Patent No.: US 7,643,927 B2
(45) Date of Patent: Jan. 5, 2010

(54) DISTANCE MEASURING DEVICE FOR CONTROL

(75) Inventor: Thomas Hils, Wurmberg (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 10/996,487

(22) Filed: Nov. 24, 2004

(65) Prior Publication Data
US 2005/0131615 A1 Jun. 16, 2005

(30) Foreign Application Priority Data
Dec. 16, 2003 (DE) ................... 103 58 857

(51) Int. Cl.
*B60T 7/12* (2006.01)

(52) U.S. Cl. .................. 701/96; 701/301; 340/435; 340/903

(58) Field of Classification Search ........... 340/342, 340/425, 435, 438, 436, 539, 933, 943, 825, 340/870, 932, 5.1, 5.2, 5.3, 5.7, 5.71, 425.5, 340/903; 701/1, 23, 24, 25, 200, 93, 96, 701/301; 342/60, 61, 69, 70, 81, 82, 89, 342/118, 128, 129, 133, 146, 357, 450
See application file for complete search history.

(56) References Cited

U.S. PATENT DOCUMENTS

| | | | | |
|---|---|---|---|---|
| 5,303,205 A | * | 4/1994 | Gauthier et al. | 367/108 |
| 5,581,232 A | * | 12/1996 | Tanaka et al. | 340/435 |
| 5,831,551 A | * | 11/1998 | Geduld | 340/905 |
| 5,942,688 A | * | 8/1999 | Kimura et al. | 73/598 |
| 6,264,337 B1 | * | 7/2001 | Rannells et al. | 359/843 |
| 6,271,765 B1 | * | 8/2001 | King et al. | 340/825.69 |
| 6,339,369 B1 | * | 1/2002 | Paranjpe | 340/436 |
| 6,393,303 B1 | * | 5/2002 | Katz | 455/562.1 |
| 6,476,732 B1 | * | 11/2002 | Stephan | 340/988 |
| 6,559,775 B1 | * | 5/2003 | King | 340/932.2 |
| 6,559,776 B2 | * | 5/2003 | Katz | 340/932.2 |
| 6,615,132 B1 | * | 9/2003 | Nagasaka et al. | 701/200 |
| 6,647,250 B1 | * | 11/2003 | Bultman et al. | 455/102 |
| 7,071,813 B2 | * | 7/2006 | Fitzgibbon | 340/5.71 |
| 7,248,153 B2 | * | 7/2007 | Danz et al. | 340/435 |
| 7,268,681 B2 | * | 9/2007 | Fitzgibbon | 340/539.11 |
| 2003/0028323 A1 | * | 2/2003 | Zeitler et al. | 701/219 |
| 2003/0197595 A1 | * | 10/2003 | Olson et al. | 340/5.61 |

FOREIGN PATENT DOCUMENTS

DE  41 23 640  1/1993

* cited by examiner

*Primary Examiner*—Gertrude Arthur Jeanglaud
(74) *Attorney, Agent, or Firm*—Kenyon & Kenyon LLP

(57) ABSTRACT

A distance measuring device in a vehicle is used for controlling a device located outside the vehicle. The controller causes a control signal to be emitted, the control signal being emitted by distance sensors located on the vehicle.

18 Claims, 1 Drawing Sheet

DISTANCE MEASURING DEVICE FOR CONTROL

BACKGROUND INFORMATION

Distance measuring devices in the vehicle, which determine the distance of a vehicle from an obstacle by emitting a transmitted signal and receiving the signal reflected from the obstacle, are known. Control of devices outside the vehicle such as entrance gates, garage doors, or barriers using portable wireless devices taken by a driver of a vehicle into the vehicle and actuated in front of a gate for opening and/or closing the gate, for example, is furthermore known. German Patent Application No. DE 41 23 640 describes a remote control device for a garage door drive, in which a car radio antenna is used as a transmitting antenna for the transmitter instead of such a hand-held transmitter. In this case, a diplexer is provided which is used for separating the radio signals and the transmitted signals.

SUMMARY OF THE INVENTION

The distance measuring device according to the present invention has the advantage over the related art that a device located outside the vehicle is controlled via transmitters of the distance measuring device which otherwise is used for measuring a distance between the vehicle and obstacles. A device for emitting the control signals may be used, which is already designed for emitting signals based on its function as a distance sensor. A separate transmitter, which would have to be provided in the case of a car radio antenna, for example, as it is usually designed only for receiving signals, may thus be omitted. In addition, the usefulness of a distance measuring device in the vehicle is enhanced because it is usable for additional applications. In addition, it is not necessary to carry in the vehicle a separate standalone remote control device having its own power supply.

It is particularly advantageous that the measuring signal and the control signal differ in frequency and/or signal shape. This prevents accidental triggering of a device outside the vehicle by a measuring signal. It is particularly advantageous that the transmitter is designed as an ultrasound transmitter because it makes simple analysis of ultrasound signals for both distance measurement and data transmission of a control intent possible.

It is furthermore advantageous that the transmitter is designed both for receiving a measuring signal and for receiving a communication signal emitted by the device located outside the vehicle, which is controlled by the distance measuring device. This makes it possible to conduct a dialog between the device located outside the vehicle and the user, i.e., a control device in the vehicle.

It is furthermore advantageous to activate all transmitters on the vehicle if a control signal is to be emitted. In this way, a user does not have to orient the vehicle in a defined position with respect to the device to be controlled.

For example, when driving through a gate to be opened automatically, the driver may approach the gate either in reverse or in forward driving mode in order to open the gate by an activation via the distance measuring device according to the present invention.

It is further advantageous to provide a display unit for displaying a function of the distance measuring device according to the present invention as a control function of a device located outside the vehicle. A user is thus informed when the distance measuring device is operating in the control mode, which may make it impossible for a distance warning to take place.

DETAILED DESCRIPTION

The distance measuring device according to the present invention may be used for controlling any devices located outside the vehicle. These may include in particular devices to be controlled for allowing the vehicle to pass or enter. These include in particular electrically powered or controlled garage doors, entrance gates, barriers, ramps, or multilevel garages having at least two movable parking levels one above the other. The present invention is elucidated in detail below using the example of controlling a garage door.

Figure 1:
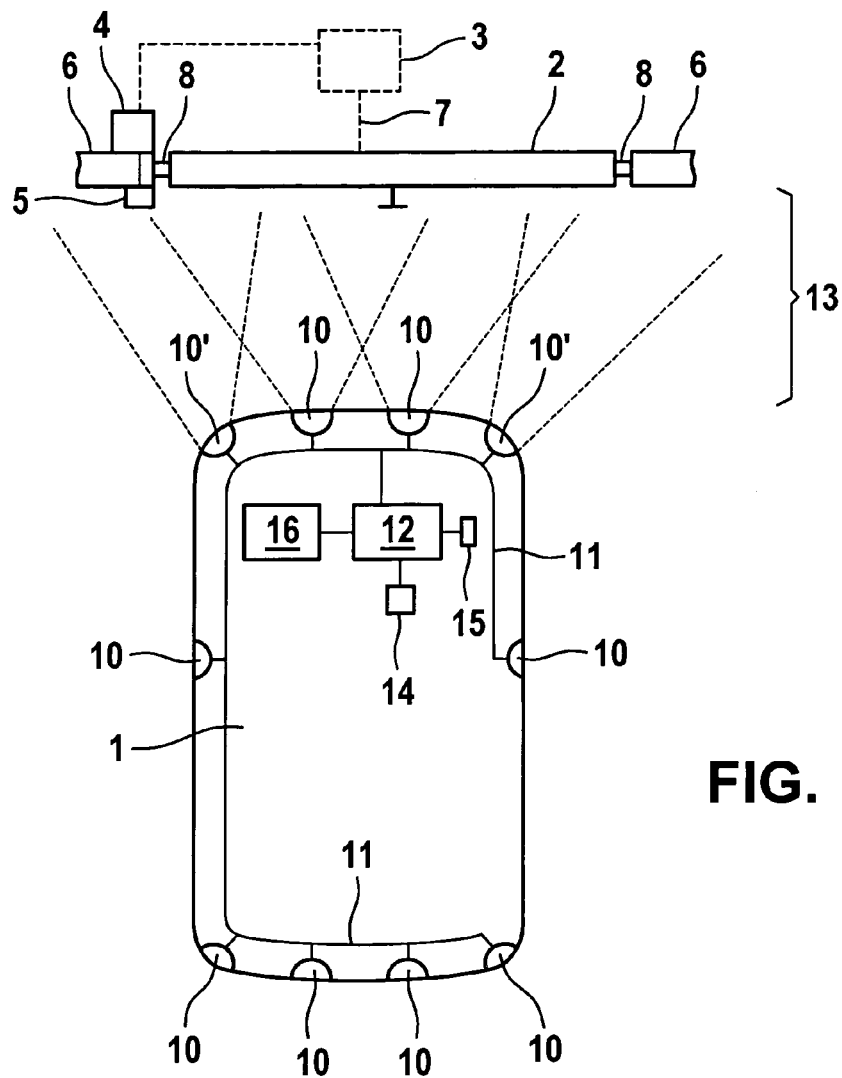
FIG. 1 shows a top view of a vehicle having a distance measuring device according to the present invention in front of a garage door.

FIG. 1 schematically shows a vehicle 1 in top view. The vehicle is in front of a garage door 2, which may be opened and closed using a motor control 3 shown in dashed lines. Motor control 3, the garage door drive, is regulated by a controller 4, which is in turn connected to a receiver 5. Receiver 5 is situated on the front of a wall 6, which surrounds the garage door. Receiver 5 is configured to receive a control signal which triggers garage door drive 3 via controller 4. The garage door drive accesses a drive belt 7, which is connected to garage door 2 and lifts garage door 2 in guide rails 8 clearing the garage door opening which exists in wall 6, so that vehicle 1 is able to enter the garage situated on the side facing away from vehicle 1.

In particular, the distance measuring device may now be used for monitoring a subsequent entry into the garage. Monitoring preferably takes place by emitting a warning signal if the vehicle gets too close to the garage walls.

The vehicle has distance sensors 10, 10', which are preferably designed as ultrasound sensors, on the front and rear and on its sides. In a further embodiment, the distance sensors may also be designed as radar sensors. The distance sensors are activated by a controller 12 via a data bus 11 located in the vehicle. Distance sensors 10, 10' operate in a measuring mode by emitting an ultrasound signal for a preferably limited time and then receiving the ultrasound signal reflected by an obstacle. The distance between vehicle 1 and the obstacle is computed from the propagation time of the ultrasound signal. Sensors are provided for this purpose on the vehicle front and on the vehicle corners in particular. In the exemplary embodiment shown here, radiation cones 13 of distance sensors 10, 10' located on the front are shown. Radiation cones 13 may also intersect. Controller 12 is connected to an operating unit 14, a pushbutton, for example, which may trigger the control of garage door drive 3. Instead of a pushbutton, this control function may also be selected via a menu selection on a touch screen.

Distance sensors situated at other locations on the vehicle may also be used. For example, on trucks or utility vehicles, the ultrasound sensors may be situated in the roof area or at mid-height of the vehicle. The position of the receiver may have to be modified accordingly.

If the garage door is to be controlled, in a first exemplary embodiment only the two corner sensors are activated to emit a control signal used for controlling the garage door and representing the command "open garage door." The control signal is received by receiver 5 and processed by controller 12 causing garage door 2 to be opened by garage door drive 3. To prevent unauthorized opening of garage door 2 by any distance measuring device, the control signal is preferably encoded, the corresponding code sequence being stored in a memory of controller 12 in particular, and being adaptable to a particular device to be controlled, in this case garage door 2. For this adaptation, controller 12 has a data interface 15 via which the appropriate control signals are transmissible to the controller. In a first embodiment, the control signal has the same frequency as the measuring signal. However, a given sequence of transmission and pause intervals of the control signal is established, transmitting a type of binary signal from vehicle 1 to receiver 5. It is also possible to transmit an analog data signal by varying the signal intensity.

In further embodiments it is also possible for all distance sensors 10, 10' of vehicle 1 to emit the measuring signal simultaneously when operating unit 14 is actuated, transmitting the control signal to a receiver located in any position with respect to vehicle 1. In a further embodiment, the individual distance sensors 10, 10' emit the control signals consecutively, so that interference between the signals is avoided.

It is also possible to provide distance sensors of different technologies, i.e., technical types, for example, radar sensors and ultrasound sensors, on vehicle 1. In this case it is generally advantageous to address sensors only of the type whose signals receiver 5 is configured to receive, i.e., only ultrasound sensors, for example. In addition to the signal "open garage door," it may be possible to transmit additional functions such as "close garage door," "emergency exit," or "lock garage door."

In a preferred embodiment, receiver 5 may also be designed as a transmitter. In this case, a signal, which is also encoded, is emitted by receiver 5 to distance sensors 10, 10' and detected by at least one of the distance sensors, decoded if needed, and relayed to controller 12. This makes it possible to transmit information regarding malfunctions, for example, of garage door drive 3. Such a malfunction may be displayed on a display unit 16 connected to controller 12. Display unit 16 is preferably designed as an instrument cluster for displaying a variety of vehicle information. A driver is thus informed about any malfunction if the garage door does not open, for example about a defect in the door drive or a blocked garage door. Such information may also be relayed to the driver if the code transmitted by the driver for opening the garage door is unauthorized or could not be recognized. The transmission may then be optionally repeated. In this case, the user may be requested to input a user ID, for example, a code number, for user identification, which is then transmitted to the receiver.

An acknowledge signal for acknowledging receipt of a control signal may also be transmitted via receiver 5 to vehicle 1. Further transmission of control signals may subsequently be suspended, and the distance measuring device may be switched over again to distance measurement exclusively.

Using an appropriate warning signal, display unit 16 may also be used for instructing the distance sensors to switch to a garage door control mode. If the control signals are emitted continuously, no distance measurement is able to take place. However, in a further embodiment, it is always possible to switch between measuring, i.e., emitting a measuring signal associated with a subsequent listening window for receiving a reflected signal, and emitting a control signal. This, in principle, makes an almost continuous distance measurement possible, while appropriate control signals may still be emitted.

Figure 2:
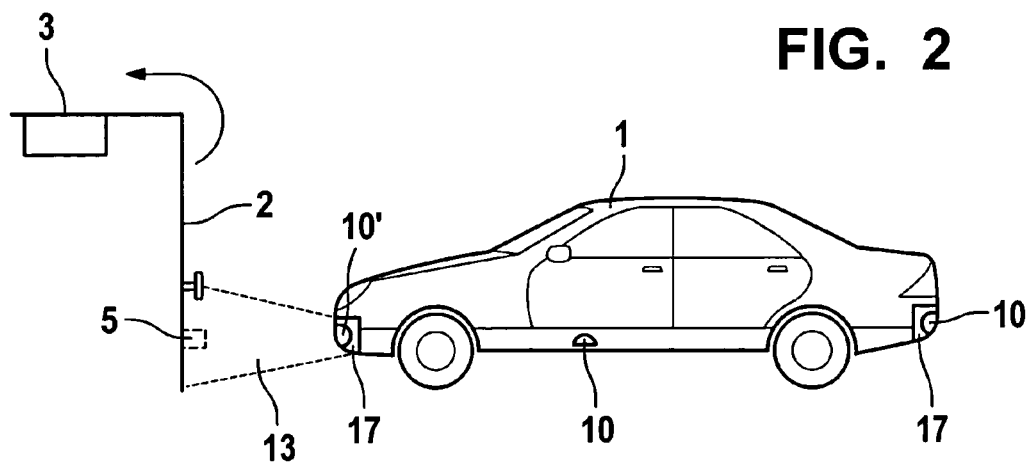
FIG. 2 shows the vehicle in a side view in front of the garage door.

FIG. 2 shows vehicle 1 in a side view in front of garage door 2. Receiver 5 is shown in dashed lines. It is preferably situated at the level of the distance measuring devices, i.e., preferably at the level of a bumper 17 of vehicle 1. This makes it possible to receive the control signals emitted by distance sensor 10.

According to a further embodiment, it is also possible to determine the distance between vehicle 1 and garage door 2 prior to activating garage door drive 3 as it may not be avoided that, when garage door 2 is opened, a lower edge of the garage door in particular is moved beyond the plane of the garage door toward the vehicle, possibly damaging vehicle 1. For this purpose, a predefined minimum distance is stored in controller 12 for opening garage door 2. If operating unit 14 is actuated, in a preferred embodiment the distance between vehicle 1 and garage door 2 is determined first via the distance sensors. A command for opening garage door 2 is transmitted by distance sensors 10, 10' to receiver 5 only if this given minimum distance between vehicle 1 and garage door 2 is exceeded. A warning is preferably output in display unit 16, for example, "distance to door too short." In a further embodiment, it is also possible to transmit the distance to receiver 5 encoded and to have controller 4 trigger the opening of the garage door via garage door drive 3 only if the minimum distance, which in this case is stored in controller 4, is exceeded.

What is claimed is:

1. A distance measuring device in a vehicle, comprising:
   at least one transceiver, wherein the transceiver emits a measuring signal, the transceiver subsequently receiving the measuring signal after the measuring signal is reflected by an object, and wherein the distance measuring device is configured to measure a distance to the object based on the received measuring signal;
   a controller, wherein the controller controls the transceiver such that the transceiver emits a control signal, separate from the measuring signal, for controlling a device situated outside the vehicle; and
   an operating unit for inputting a control command for causing the control signal to be emitted to the device situated outside the vehicle.

2. The distance measuring device according to claim 1, wherein the measuring signal and the control signal differ in at least one of (a) their frequencies and (b) their signal shapes.

3. The distance measuring device according to claim 1, wherein the transceiver is an ultrasound transceiver.

4. The distance measuring device according to claim 1, wherein an acknowledge signal is emitted by the device situated outside the vehicle.

5. The distance measuring device according to claim 1, wherein the at least one transceiver includes a plurality of transceiver of one type on the vehicle for emitting the control signal.

6. The distance measuring device according to claim 1, further comprising a display unit for displaying an operating state of the distance measuring device.

7. The distance measuring device according to claim 6, wherein the display unit is for displaying an emission of a control signal.

8. The distance measuring device according to claim 1, wherein the distance measuring device is used for activating a device situated outside the vehicle designed as a garage door drive.

9. A distance measuring device in a vehicle, comprising:
   at least one transceiver, wherein the transceiver emits a measuring signal, the transceiver subsequently receiving the measuring signal after the measuring signal is reflected by an object, and wherein the distance measuring device is configured to measure a distance to the object based on the received measuring signal;

a controller, wherein the controller controls the transceiver such that the transceiver emits a control signal, separate from the measuring signal, for controlling a device situated outside the vehicle, the transceiver receiving an acknowledge signal that acknowledges receipt of the control signal; and an operating unit for inputting a control command for causing the control signal to be emitted to the device situated outside the vehicle.

10. The distance measuring device according to claim 9, wherein the measuring signal and the control signal differ in at least one of (a) their frequencies and (b) their signal shapes.

11. The distance measuring device according to claim 9, wherein the transceiver is an ultrasound transceiver.

12. The distance measuring device according to claim 9, wherein the acknowledge signal is emitted by the device situated outside the vehicle.

13. The distance measuring device according to claim 9, wherein the at least one transceiver includes a plurality of transceiver of one type on the vehicle for emitting the control signal.

14. The distance measuring device according to claim 9, further comprising a display unit for displaying an operating state of the distance measuring device.

15. The distance measuring device according to claim 14, wherein the display unit is for displaying an emission of a control signal.

16. The distance measuring device according to claim 9, wherein the distance measuring device is used for activating a device situated outside the vehicle designed as a garage door drive.

17. distance measuring device in a vehicle, comprising:
a transmitter configured to emit a measuring signal;
a controller configured to control the transmitter such that the transmitter transmits a control signal for controlling a device situated outside the vehicle;
an operating unit for inputting a control command for causing the control signal to he emitted to the device situated outside the vehicle; and
a display unit for displaying an operating state of the distance measuring device.

18. The distance measuring device according to claim 17, wherein the display unit displays information regarding a transmission of the control signal.

* * * * *